United States Patent [19]

Park et al.

[11] Patent Number: 5,407,965

[45] Date of Patent: Apr. 18, 1995

[54] CROSS-LINKED ETHYLENIC POLYMER FOAM STRUCTURES AND PROCESS FOR MAKING

[75] Inventors: Chung P. Park, Pickerington, Ohio; Pak-Wing S. Chum; George W. Knight, both of Lake Jackson, Tex.

[73] Assignee: The Dow Chemical Company, Midland, Mich.

[21] Appl. No.: 295,129

[22] Filed: Aug. 24, 1994

Related U.S. Application Data

[63] Continuation of Ser. No. 252,151, Jun. 1, 1994, which is a continuation of Ser. No. 148,711, Nov. 8, 1993, abandoned, which is a continuation of Ser. No. 54,329, Apr. 28, 1993, Pat. No. 5,288,762.

[51] Int. Cl.$^6$ ............................................. C08J 9/00
[52] U.S. Cl. ................................. 521/81; 521/79; 521/134; 521/139; 521/140; 521/142; 521/143
[58] Field of Search ............. 521/81, 79, 134, 142, 521/143, 139, 140

[56] References Cited

U.S. PATENT DOCUMENTS

| | | | |
|---|---|---|---|
| 4,649,001 | 3/1987 | Nakamura et al. | 264/50 |
| 4,778,829 | 10/1988 | Ichimura et al. | 521/60 |
| 4,808,361 | 2/1992 | Castro et al. | 264/255 |
| 4,861,531 | 9/1989 | Maeda | 521/60 |
| 4,870,111 | 9/1989 | Donuiff | 521/60 |
| 4,897,455 | 1/1990 | Welborn, Jr. | 526/129 |
| 4,914,253 | 4/1990 | Chang | 585/523 |
| 4,937,301 | 6/1990 | Chang | 526/128 |
| 5,055,438 | 10/1991 | Canich | 502/117 |
| 5,091,435 | 2/1992 | Suzuki et al. | 521/134 |

FOREIGN PATENT DOCUMENTS

| | | | |
|---|---|---|---|
| 0206794A1 | 12/1986 | European Pat. Off. | C08F 4/76 |
| 0416815A2 | 3/1991 | European Pat. Off. | C08F 10/00 |
| WO8909237 | 10/1989 | WIPO | C08F 4/60 |
| WO9003414 | 4/1990 | WIPO | C08L 23/08 |

OTHER PUBLICATIONS

K. Swogger; "The Material Properties of Polymers made from Constrained Geometry Catalysts"; pp. 155–165; Sep. 22–24, 1992; *Proceedings of the Second International Business Forum on Specialty Polyolefins*.

G. Schwank; "Selected Applications for Constrained Geometry Catalyst Technology (CGCT) Polymers"; Sep. 23, 1992; *Proceedings of the Second International Business Forum on Specialty Polyolefins*.

"Dow Catalyst Advance is a Threat to Exxon"; p. 5; Dec. 23, 1991; *Chemical Marketing Reporter*.

"Dow Unveils Low-Pressure LDPE System"; pp. 3 and 5; Oct. 24, 1979; *The Journal of Commerce*.

Bernie Miller; "Dow Unveils Constrained Geometry PES"; p. 24; Dec. 1992; *Plastics World*.

"New Technology, New Trade Name"; p. 35; Feb. 1993; *Plastics Engineering*.

H. Tilton; "The Positive Track"; pp. SR3–SR5; Feb. 15, 1993; *Chemical Marketing Reporter*.

"Dow Plastics Announces Commercial Plans for IN-SITE"; Jan. 15, 1993; No. 11; *Dow Today*.

"Meanwhile, Dow may be Leapfrogging Exxpol with Single-site Catalysts of its own"; p. 1; Dec. 23, 1991; vol. 23, No. 25; *Plastics Focus*.

R. Martino; "New Polyolefin Resins Emerge:

(List continued on next page.)

*Primary Examiner*—Morton Foelak
*Attorney, Agent, or Firm*—J. Robert Dean, Jr.

[57] ABSTRACT

Disclosed is a cross-linked ethylenic polymer foam structure of an ethylenic polymer material of a cross-linked, substantially linear ethylenic polymer. The substantially linear ethylenic polymer having in an uncross-linked state has: a) a melt flow ratio, $I_{10}/I_2$, $\geq 5.63$; b) a molecular weight distribution, $M_w/M_n$, defined by the equation: $M_w/M_n \leq (I_{10}/I_2) - 4.63$; and c) a critical shear rate at onset of surface melt fracture of at least 50 percent greater than the critical shear rate at the onset of surface melt fracture of a linear ethylenic polymer having about the same $I_2$ and $M_w/M_n$. Further disclosed is a process for making the above foam structure.

16 Claims, No Drawings

OTHER PUBLICATIONS

'Branched Linear' Copolymers"; p. 11; Jan. 1993; *Modern Plastics*.

"Dow gets Patent on new Olefin Copolymers"; p. 11; Jan., 1993; *Modern Plastics*.

"Novel Rheological Behavior Claimed for New-tech Polyolefins"; pp. 23–25; Nov., 1992; *Plastics Technology*.

"New Polyolefins Excel as Impact Modifiers"; p. 11; Nov. 1992; *Plastics Technology*.

"Dow Plans Three-phase Rollout of Polyolefin 'Plastomers' and Elastomers"; p. 63; Nov. 1992; *Plastics Technology*.

"New Name for Constrained Geometry Catalyst Technology Dow Announces INSITE"; Dec. 16, 1992; *News from Dow Plastics*.

"Dow Plastics Breaking the Rules with INSITE"; Feb. 22, 1993; *News from Dow Plastics*.

G. Knight and S. Lai; "Dow Constrained Geometry Catalyst Technology: New Rules for Ethylene α-Olefin Interpolymers-Unique Structure and Property Relationships"; Feb. 22, 1993; Society of Plastics Engineers RETEC Polyolefins VIII Conference.

K. Swogger, C. Kao; "Process Technology for Unique Polymer Design Using Dow Constrained Geometry Catalyst"; Feb. 22, 1993; Society of Plastics Engineers RETEC "Polyolefins VIII" Conference.

5,407,965

CROSS-LINKED ETHYLENIC POLYMER FOAM STRUCTURES AND PROCESS FOR MAKING

CROSS-REFERENCE TO RELATED APPLICATIONS

This application is a continuation from application U.S. Ser. No. 08/252,151, filed Jun. 1, 1994; which is a continuation from U.S. Ser. No. 08/148,711, filed Nov. 8, 1993, now abandoned; which is a continuation from U.S. Ser. No. 08/054,329, filed Apr. 28, 1993, now U.S. Pat. No. 5,288,762.

BACKGROUND OF THE INVENTION

This invention relates to a composition of and a process for manufacturing a cross-linked ethylenic polymer foam structure having enhanced processability and physical properties.

Commercially-available, cross-linked ethylenic polymer foam structures (XLPE) are typically made with conventional low density polyethylene (LDPE) resins made by high pressure processes. LDPE resins have found favor because of their relatively low melt temperatures and desirable processability.

It would be desirable to have an XLPE foam structure with enhanced strength and resiliency, yet retain the low foam density and desirable resin processability afforded by the use of LDPE resins. One means of enhancing strength and resiliency is to employ a conventional linear low density polyethylene (LLDPE), a copolymer of ethylene and a $C_4$-$C_{10}$ alpha-olefin. Unfortunately, LLDPE resin is difficult to process and to a XLPE foam, and results in a relatively high density foam structure with poor quality. It would be desirable to have an XLPE foam structure similar in strength and resiliency to an XLPE foam structure of LLDPE while comprising a resin having in an uncross-linked state processability similar to an LDPE resin.

SUMMARY OF THE INVENTION

According to the present invention, there is a cross-linked ethylenic polymer foam structure of an ethylenic polymer material of a cross-linked, substantially linear ethylenic polymer. The substantially linear ethylenic polymer has in an uncross-linked state a: a) a melt flow ratio, $I_{10}/I_2$, $\geq 5.63$; b) a molecular weight distribution, $M_w/M_n$, defined by the equation: $M_w M_n \leq (I_{10}/I_2) - 4.63$; and c) a critical shear rate at onset of surface melt fracture of at least 50 percent greater than the critical shear rate at the onset of surface melt fracture of a linear ethylenic polymer having about the same $I_2$ and $M_w M_n$. The foam structure is strong, resilient, and of low density. The structure has high strength and resiliency similar to that of a foam structure comprised of cross-linked LLDPE, and has low density and quality similar to that of a foam structure of cross-linked LDPE.

Further according to the present invention, there is a process for making a cross-linked ethylenic polymer foam structure. First, a foamable melt polymer material is formed by blending and heating a decomposable chemical blowing agent and an ethylenic polymer material comprising a substantially ethylenic polymer having: a) a melt flow ratio, $I_{10}/I_2$, $\geq 5.63$; b) a molecular weight distribution, $M_w/M_n$, defined by the equation: $M_w/M_n \leq (I_{10}/I_2) - 4.63$; and c) a critical shear rate at onset of surface melt fracture of at least 50 percent greater than the critical shear rate at the onset of surface melt fracture of a linear ethylenic polymer having about the same $I_2$ and $M_w/M_n$. Second, cross-linking is induced in the foamable melt polymer material. Third, the foamable melt polymer material is expanded by exposing it to an elevated temperature to form the foam structure. The substantially linear ethylenic polymer has better processability and foamability than LLDPE and similar to that of LDPE.

DETAILED DESCRIPTION

The present cross-linked foam structure offers a number of advantages over cross-linked foam structures of the prior art. The present structure has desirable high strength and resiliency similar to that of a foam structure of cross-linked LLDPE, and has a desirable low density similar to that of a foam structure of cross-linked LDPE. The present structure has greater strength and resiliency than a cross-linked LDPE foam structure, can be made softer as well. The present structure can have softness similar to foam structures of a soft ethylene copolymer, e.g. ethylene/vinyl acetate (EVA) copolymer or a blend of polyvinylchloride and a nitrile rubber, but has greater strength and resiliency. In addition, the present structure, being more thermally stable than an EVA foam structure, does not liberate unpleasant smell during foam expansion, fabrication, and usage. Soft, strong cross-linked foam structures are useful in sporting good, medical device, and cushioning applications.

In the following paragraphs, the chemical and physical characteristics of the substantially linear ethylenic polymer in a substantially non-cross-linked or uncross-linked state and methods for making same are described. The substantially linear ethylenic polymer is cross-linked and expanded or foamed to form the present cross-linked foam structure. The desirable characteristics of the non-cross-linked or uncross-linked polymer aid in extrusion and processing of the polymer prior to and during cross-linking and foaming.

Elastic, substantially linear ethylenic polymers have unusual properties, including an unusual combination of properties, which leads to enhanced processability of the novel polymers. The substantiality linear ethylenic polymers have processability similar to highly branched low density polyethylene, but the strength and toughness similar to linear low density polyethylene.

The substantially linear ethylenic polymers preferably have a critical shear rate at onset of surface melt fracture of at least 50 percent greater than the critical shear rate at the onset of surface melt fracture of a linear ethylenic polymer having about the same $I_2$ and $M_w/M_n$.

The elastic substantially linear ethylenic polymers also have a processing index (PI) less than or equal to about 70 percent of the PI of a comparative linear ethylenic polymer at about the same $I_2$ and $M_w/M_n$. The elastic substantially linear ethylenic polymers also preferably have a melt flow ratio, $I_{10}/I_2$, $\geq 5.63$, and preferably a molecular weight distribution, $M_w/M_n$, defined by the equation: $M_w/M_n \leq (I_{10}/I_2) - 4.63$.

Elastic substantially linear ethylenic polymers comprising ethylene homopolymers or a copolymer of ethylene with at least one $C_8$-$C_{20}$ α-olefinic (alphaolefinic) comonomer are especially preferred.

Other properties of the substantially linear polymers include: a) a density preferably from about 0.85 grams/-cubic centimeter (g/cm$^3$) to about 0.97 g/cm$^3$; and b) a melt index, $I_2$, preferably from about 0.01 grams/10 minutes to about 1000 gram/10 minutes.

Preferably the melt flow ratio, $I_{10}/I_2$, is from about 7 to about 20.

The molecular weight distribution ($M_w/M_n$) is preferably about 3.5 or less, more preferably from about 1.5 to about 2.5, and most preferably from about 1.7 to about 2.3.

Throughout this disclosure, "melt index" or "$I_2$" is measured in accordance with ASTM D-1238 (190° C./2.16 kg); "$I_{10}$" is measured in accordance with ASTM D-1238 (190° C./10 kg).

The melt tension of these new polymers is also surprisingly good, e.g., as high as about 2 grams or more, especially for polymers which have a very narrow molecular weight distribution (i.e., $M_w/M_n$ from about 1.5 to about 2.5).

A preferred substantially linear ethylenic polymer useful in the present foam structure has the following properties: a melt flow ratio index $I_2$ (measured per ASTM method D-1238 condition E) of 0.5 to 20 dg/min, preferably, from 2.5 to 10 dg/min; a melt index ratio, $I_{10}/I_2$ (per ASTM D1238) greater than 7.5, more preferably greater than 9; a single DSC (differential scanning calorimetry) melting peak.

The substantially linear polymers can be homopolymers of ethylene (polyethylene) or they can be copolymers of ethylene with at least one $C_3$-$C_{20}$ α-olefinic and/or $C_2$-$C_{20}$ acetylenically compounds and/or $C_4$-$C_{18}$ diolefinics and/or other unsaturated comonomers. Useful comonomers include ethylenically unsaturated monomers, conjugated or nonconjugated dienes, polyenes, etc. Preferred monomers include the $C_3$-$C_{10}$ α-olefinics especially 1-propene, isobutylene, 1-butene, 1-hexene, 4-methyl-l-pentene, and 1-octene. Other useful comonomers include styrene, halo- or alkyl substituted styrenes, tetrafluoroethylene, vinylbenzocyclobutane, 1,4-hexadiene, and naphtenics (e.g., cyclo-pentene, cyclo-hexene and cyclo-octene).

The term "substantially linear polymers" means that the polymer backbone is substituted with about 0.0 long chain branches/1000 carbons to about 3 long chain branches/1000 carbons, more preferably from about 0.01 long chain branches/1000 carboris to about 1 long chain branches/1000 carbons, and especially from about 0.05 long chain branches/1000 carbons to about 1 long chain branches/1000 carbons.

The term "linear ethylenic polymers" means that the ethylenic polymer does not have long chain branching. That is, the linear ethylenic polymer has an absence of long chain branching, as for example the conventional linear low density polyethylene polymers or linear high density polyethylene polymers made using Ziegler polymerization processes (for example, U.S. Pat. Nos. 4,076,698 or 3,645,992, both of which are incorporated herein by reference). The term "linear ethylenic polymers" does not refer to branched ethylenic polymers such as branched polyethylene, ethylene/vinyl acetate copolymers, or ethylene/ester copolymers which are made by high pressure processes and known to those skilled in the art to have numerous long chain branches.

Long chain branching is defined herein as a chain length of at least about 6 carbons, above which the length cannot be distinguished using $^{13}C$ nuclear magnetic resonance (NMR) spectroscopy. The long chain branch can be as long as about the same length as the length of the polymer back-bone.

Long chain branching is determined by using $^{13}C$ NMR spectroscopy and is quantified using the method of Randall (*Rev. Macromol. Chem. Phys.*, C29 (2&3), p. 285–297), the disclosure of which is incorporated herein by reference.

Excellent teachings regarding substantially linear ethylenic polymers and processes for making are seen in U.S. Ser. Nos. 07/939,281, filed Sep. 9, 1992 and 07/776,130, filed Oct. 15, 1992, both of which are incorporated herein by reference.

"Melt tension" is measured by a specially designed pulley transducer in conjunction with themeit indexer. Melt tension is the load that the extrudate or filament exerts while passing over the pulley at the standard speed of 30 rpm. The melt tension measurement is similar to the "Melt Tension Tester" made by Toyoseiki and is described by John Dealy in *Rheometers for Molten Plastics*, published by Van Nostrand Reinhold Co. (1982) one page 250–251.

The SCBDI (Short Chain Branch Distribution Index) or CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the substantially linear ethylenic polymers of the present invention is preferably greater than about 30 percent, especially greater than about 50 percent. Thus, the substantially linear polymers are homogeneously branched.

A unique characteristic of the present polymers is a highly unexpected flow property where the $I_{10}/I_2$ value is essentially independent of polydispersity index (i.e. $M_w/M_n$). This is contrasted with conventional polyethylene resins having rheological properties such that as the polydispersity index increases, the $I_{10}/I_2$ value also increases. For the substantially linear ethylenic polymers described herein, the $I_{10}/I_2$ value indicates the amount of long chain branching (i.e., the higher the $I_{10}/I_2$ value, the more long chain branching).

The density of the ethylene or ethylene/α-olefinic substantially linear ethylenic polymers is measured in accordance with ASTM D-792 and is generally from about 0.85 g/cm³ to about 0.97 g/cm³ and preferably from about 0.87 g/cm³ to about 0.95 g/cm³.

The molecular weight of the ethylene or ethylene/α-olefinic substantially linear ethylenic polymers in the present invention is conveniently indicated using a melt index measurement according to ASTM D-1238, Condition 190° C./2.16 kg (formally known as "Condition (E)" and also known as $I_2$). Melt index is inversely related to the molecular weight of the polymer. Thus, the higher the molecular weight, the lower the melt index, although the relationship is not linear. The melt index for the ethylene or ethylene/α-olefinic substantially linear ethylenic polymers used herein is generally from about 0.01 grams/10 minutes (g/10 min) to about 1000 g/10 min, preferably from about 0.05 g/10 min to about 100 g/10 min, and especially from about 0.1 g/10 min to about 20 g/10 min.

Additives such as antioxidants (e.g., hindered phenolics (e.g., Irganox® 1010), phosphites (e.g., Irgafos®

168)), pigments, and the like can also be included in the polyethylene compositions, to the extent that they do not interfere with the enhanced properties discovered by applicants.

Ethylenic polymer materials of blends of the substantially linear ethylenic polymer and a suitable different ethylenic polymer or other natural or synthetic polymers are possible. Suitable different ethylenic polymers include low (LDPE) (for example, high pressure, free-radical polymerization techniques), medium (MDPE), and high density polyethylenes (HDPE) (for example, those made using Ziegler catalysts as in U.S. Pat. No. 4,076,698), ethylene/ester copolymers, ethylene/vinyl acetate copolymers, copolymers of ethylene and ethylenically unsaturated carboxylic acid, homo and copolymers of alpha-ethylenics, etc. Other suitable polymers include polystyrene (including high impact polystyrene, styrene-butadiene block copolymers, polyisoprene, and other rubbers. Blends comprising a major proportion of the resin having the higher melting point are preferred. Regardless of composition, the ethylenic polymer material preferably comprises greater than 50 and more preferably greater than 70 weight percent of ethylenic monomeric units. The ethylenic polymer material may be comprised completely or entirely of ethylenic monomeric units. Preferred blends are those with the substantially linear ethylenic polymer and other conventional ethylenic polymers such as LDPE, HDPE, ethylene/acrylic acid copolymer (EAA), and LLDPE.

The improved melt elasticity and processibility of the substantially linear polymers according to the present invention result, it is believed, from their method of production. The polymers may be produced via a continuous (as opposed to a batch) controlled polymerization process using at least one reactor, but can also be produced using multiple reactors (e.g., using a multiple reactor configuration as described in U.S. Pat. No. 3,914,342) at a polymerization temperature and pressure sufficient to produce the polymers having the desired properties. According to one embodiment of the present process, the polymers are produced in a continuous process, as opposed to a batch process. Preferably, the polymerization temperature is from about 20° C. to about 250° C., using constrained geometry catalyst technology. If a narrow molecular weight distribution polymer ($M_w/M_n$ of from about 1.5 to about 2.5) having a higher $I_{10}/I_2$ ratio (e.g. $I_{10}/I_2$ of about 7 or more, preferably about 8 or more, more preferably about 9 or more) is desired, the ethylene concentration in the reactor is preferably not more than about 8 percent by weight of the reactor contents, especially not more than about 4 percent by weight of the reactor contents. Preferably, the polymerization is performed in a solution polymerization process. Generally, manipulation of $I_{10}/I_2$ while holding $M_w/M_n$ relatively low for producing the novel polymers described herein is a function of reactor temperature and/or ethylene concentration. Reduced ethylene concentration and higher temperature generally produces higher $I_{10}/I_2$.

The molecular weight distribution ($M_w/M_n$) of the individual polymer samples is analyzed by gel permeation chromatography (GPC) on a Waters 150° C. high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science, Polymer Letters*, Vol. 6, (621) 1968, incorporated herein by reference) to derive the following equation: $M_{polyethylene} = a * (M_{polystyrene})^b$. In this equation, $a=0.4316$ and $b=1.0$. Weight average molecular weight, $M_w$, is calculated in the usual manner according to the following formula: $M_w = \Sigma\ w_i * M_i$, where $w_i$ and $M_i$ are the weight fraction and molecular weight, respectively, of the $i^{th}$ fraction eluting from the GPC column.

The rheological processing index (PI) is measured by a gas extrusion rheometer (GER). The GER is described by M. Shida, R. N. Shroff and L. V. Cancio in *Polym. Eng. Sci.*, Vol. 17, no. 11, p. 770 (1977), and in *Rheometers for Molten Plastics* by John Dealy published by Van Nostrand Reinhold Co. (1982) on page 97–99, the disclosures of both of which are incorporated herein by reference. The processing index is measured at a temperature of 190° C., at nitrogen pressure of 2500 psig using 0.0296 inch diameter, 20:1 L/D die having an entrance angle of 180 degrees. The GER processing index is calculated in millipoise units from the following equation:

$$PI = 2.15 \times 10^6\ \text{dynes/cm}^2 / (1000 \times \text{shear rate}),$$

wherein:
$2.15 \times 10^6$ dynes/cm$^2$ is the shear stress at 2500 psi, and the shear rate is the shear rate at the wall as represented by the following equation:

$$32\ Q'/(60\ \text{sec/min})(0.745)(\text{Diameter} \times 2.54\ \text{cm/in})^3$$

wherein:
$Q'$ is the extrusion rate (gms/min),
0.745 is the melt density of polyethylene (gm/cm$^3$), and
Diameter is the orifice diameter of the capillary (inches).

The PI is the apparent viscosity of a material measured at apparent shear stress of $2.15 \times 10^6$ dyne/cm$^2$.

For the substantially linear ethylenic polymers disclosed herein, the PI is less than or equal to 70 percent of that of a comparative linear ethylenic polymer at about the same $I_2$ and $M_w/M_n$.

Suitable constrained geometry catalysts for use herein preferably include constrained geometry catalysts as disclosed in U.S. Ser. Nos.: 545,403, filed Jul. 3, 1990; 758,654, filed Sep. 12, 1991; 758,660, filed Sep. 12, 1991; and 720,041, filed Jun. 24, 1991, the teachings of all of which are incorporated herein by reference. The monocyclopentadienyl transition metal olefin polymerization catalysts taught in U.S. Pat. No. 5,026,798, the teachings of which are incorporated herein by reference, are also suitable for use in preparing the polymers of the present invention.

Constrained-geometry catalysts useful in making the substantially linear ethylenic polymer comprise a metal complex and a cocatalyst.

Metal complexes correspond to the Formula (I):

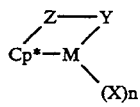 (I)

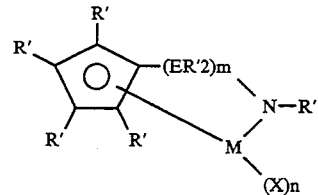 (II)

wherein:

M is selected from the group consisting of groups 3–10 or the Lanthanide series of the Periodic Table of the Elements;

Cp* is selected from the group consisting of indenyl, tetrahydroindenyl, fluorenyl, octahydrofluorenyl, tetrahydrofluorenyl, cyclopentadienyl, and R-substituted cyclopentadienyl bound in an $\eta^5$ bonding mode to M;

X is, independently each occurrence, an anionic ligand group selected from the group consisting of hydride, halide, alkyl of up to 30 carbon atoms, alkoxy having up to a total of 30 carbon and oxygen atoms, cyanide, azide, acetylacetonate, aryl of up to 30 carbon atoms, aryloxy having up to a total of 30 carbon and oxygen atoms, norbornyl, and benzyl;

n is 0, 1, 2, 3, or 4 and is 2 less than the valence of M;

Y is NR″, PR″, O, or S;

Z is CR$_2$*, CR$_2$* CR$_2$*, SiR$_2$*, SiR$_2$*SiR$_2$*;

R is selected from the group consisting of alkyl having 1 to 20 carbon atoms, cyano, norbornyl, benzyl, aryl of up to 20 carbon atoms, (R′)$_3$Si, and (R′)$_3$Ge;

R′ is selected from the group consisting of C$_1$-C$_{20}$ alkyl and aryl of up to 20 carbon atoms;

R″ is selected from the group consisting of C$_1$-C$_{20}$alkyl, aryl of up to 20 carbon atoms, benzyl, haloaryl having up to a total of 20 carbon and halogen atoms, 2-methoxyphenyl, 4-methoxyphenyl, and norbornyl; and R* is selected from the group consisting of hydrogen, C$_1$-C$_{20}$ alkyl, haloalkyl having up to a total of 20 carbon and halogen atoms, aryl of up to 20 carbon atoms, and haloaryl of up to a total of 20 carbon and halogen atoms. Preferred metal complexes are those of Formula (I) wherein:

M is titanium, zirconium, or hafnium;

X is, independently each occurrence, selected from the group consisting of halide, alkyl of up to 30 carbon atoms, aryl of up to 30 carbon atoms, and benzyl;

n is 1 or 2;

Y is NR″;

Z is CR$_2$*CR$_2$* or SiR$_2$*;

R is selected from the group consisting of alkyl having 1 to 20 carbon atoms, benzyl, aryl of up to 20 carbon atoms, and (R′)$_3$Si;

R′ is selected from the group consisting of C$_1$-C$_{20}$ alkyl and aryl of up to 20 carbon atoms;

R″ is selected from the group consisting of C$_1$-C$_{20}$ alkyl, aryl of up to 20 carbon atoms, and benzyl; and R* is selected from the group consisting of hydrogen, C$_1$-C$_{20}$ alkyl, and aryl of up to 20 carbon atoms.

It should be noted that the complex may exist as a dimer or higher oligomer. Further preferably, at least one of R, Z, or R″ is an electron donating moiety. Thus, highly preferably Y is a nitrogen or phosphorus containing group corresponding to the formula —NR″— or —PR″— wherein R″ is C$_1$-C$_{20}$ alkyl, i.e., an alkyl amido or alkyl phosphido group.

Most highly preferred complex compounds are amidosilane- or amidoalkanediyl- compounds corresponding to Formula (II):

wherein:

M is titanium, zirconium or hafnium, bound in an $\eta^5$ bonding mode to the cyclopentadienyl group;

R′ each occurrence is independently selected from the group consisting of hydrogen, silyl, alkyl, aryl and combinations thereof, said R′ having up to 10 carbon or silicon atoms;

E is silicon or carbon;

X independently each occurrence is hydride, halo, alkyl, aryl, aryloxy or alkoxy, said X having up to 10 carbons;

m is 1 or 2; and on is 1 or 2.

Examples of the above most highly preferred metal coordination compounds include compounds wherein the R′ on the amido group is methyl, ethyl, propyl, butyl, pentyl, hexyl, (including isomers), norbornyl, benzyl, or phenyl; the cyclopentadienyl group is cyclopentadienyl, indenyl, tetrahydroindenyl, fluorenyl, or octahydrofluorenyl;

R′ on the foregoing cyclopentadienyl groups each occurrence is hydrogen, methyl, ethyl, propyl, butyl, pentyl, hexyl, (including isomers), norbornyl, benzyl, or phenyl; and X is chloro, bromo, iodo, methyl, ethyl, propyl, butyl, pentyl, hexyl, (including isomers), norbornyl,-benzyl, or phenyl.

Specific compounds include: (tert-butylamido) (tetramethyl-$\eta^5$-cyclopentadienyl)-1,2-ethanediylzirconium dichloride, (tert-butylamido)(tetramethyl-$\eta^5$-cyclopentadienyl)-1,2ethanediyltitanium dichloride, (methylamido)(tetramethyl-,$\eta^5$-cyclopentadienyl)-1,2ethanediylzirconium dichloride, (methylamido)(tetramethyl-$\eta^5$-cyclopentadienyl)-1,2ethanediyltitanium dichloride, (ethylamido) (tetramethyl-$\eta^5$-cyclopentadienyl)-methylenetitanium dichloro, (tert-butylamido)dibenzyl(tetramethyl-$\eta^5$-cyclopentadienyl) silane zirconium dibenzyl, (benzylamido)dimethyl- (tetramethyl-$\eta^5$-cyclopentadienyl)silanetitanium dichloride, (phenylphosphido)dimethyl(tetramethy-$\eta^5$-cyclopentadienyl)silanezirconium dibenzyl, (tert-butylamido)dimethyl (tetramethyl-$\eta^5$-cyclopentadienyl)silanetitanium dimethyl, and the like.

The complexes may be prepared by contacting a derivative of a metal, M, and a group I metal derivative or Grignard derivative of the/cyclopentadienyl compound in a solvent and separating the salt byproduct. Suitable solvents for use in preparing the metal complexes are aliphatic or aromatic liquids such as cyclohexane, methylcyclohexane, pentane, hexane, heptane, tetrahydrofuran, diethyl ether, benzene, toluene, xylene, ethylbenzene, etc., or mixtures thereof.

In a preferred embodiment, the metal compound is MX$_{n+1}$, i.e., M is in a lower oxidation state than in the corresponding compound, MX$_{n+2}$ and the oxidation state of M in the desired final complex. A noninterfering oxidizing agent may thereafter be employed to raise the oxidation state of the metal. The oxidation is accomplished merely by contacting the reactants utilizing solvents and reaction conditions use in the preparation of the complex itself. By the term "noninterfering oxidizing agent" is meant a compound having an oxidation potential sufficient to raise the metal oxidation state without interfering with the desired complex formation or subsequent polymerization processes. A particularly suitable noninterfering oxidizing agent is AgCl or an organic halide such as methylene chloride. The foregoing techniques are disclosed in U.S. Ser. Nos. 545,403, filed Jul. 3, 1990 and 702,475, filed May 20, 1991, the teachings of both of which are incorporated herein by reference.

Additionally the complexes may be prepared according to the teachings of the copending U.S. Ser. No. 778,433 entitled: "Preparation of Metal Coordination Complex (I)", filed in the names of Peter Nickias and David Wilson, on Oct. 15, 1991 and the copending U.S. Ser. No. 778,432 entitled: "Preparation of Metal Coordination Complex (II)" filed in the names of Peter Nickias and David Derore, on Oct. 15, 1991, the teachings of which are incorporated herein by reference thereto.

Suitable cocatalysts for use herein include polymeric or oligomeric aluminoxanes, especially methyl aluminoxane, as well as inert, compatible, noncoordinating, ion forming compounds. So-called modified methyl aluminoxane (MMAO) is also suitable for use as a cocatalyst. One technique for preparing such modified aluminoxane is disclosed in U.S. Pat. No. 5,041,584, the teachings of which are incorporated herein by reference. Aluminoxanes can also be made as disclosed in U.S. Pat. Nos. 5,542,199, 4,544,762, 5,015,749, and 5,041,585, the entire specification of each of which is incorporated herein by reference. Preferred cocatalysts are inert, noncoordinating, boron compounds.

Ionic active catalyst species which can be used to polymerize the polymers described herein correspond to Formula (III):

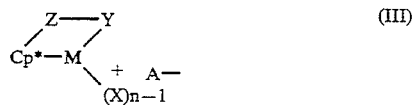

wherein:

M, Cp* X Y and Z are as defined for Formula (I) above;

n is 1, 2, 3, or 4 and is 2 less than the oxidation state of M; and

A- is a noncoordinating, compatible anion.

As used herein, the recitation "noncoordinating, compatible anion" means an anion which either does not coordinate to the monocyclopentadienyl or substituted monocyclopentadienyl group containing cation or which is only weakly coordinated to said cation thereby remaining sufficiently labile to be displaced by a neutral Lewis base. A noncoordinating, compatible anion specifically refers to a compatible anion which when functioning as a charge balancing anion in the catalyst system of this invention does not transfer an anionic substituent or fragment thereof to said cation thereby forming a neutral four coordinate metallocene and a neutral metal byproduct. "Compatible anions" are anions which are not degraded to neutrality when the initially formed complex decomposes and are noninterfering with desired subsequent polymerization or other uses of the complex.

One method of making the ionic catalyst species which can be utilized to make the polymers of the present invention involve combining: a) at least one first component which is a mono(cyclopentadienyl) derivative of a metal of Group 3-10 or the Lanthanide Series of the Periodic Table of the Elements containing at least one substituent which will combine with the cation of a second component (described hereinafter) which first component is capable of forming a cation formally having a coordination number that is one less than its valence; and b) at least one second component which is a salt of a Bronsted acid and a noncoordinating, compatible anion.

More particularly, the non-coordinating, compatible anion of the Bronsted acid salt may comprise a single coordination complex comprising a charge-bearing metal or metalloid core, which anion is both bulky and non-nucleophilic. The recitation "metalloid", as used herein, includes non-metals such as boron, phosphorus and the like which exhibit semi-metallic characteristics.

Illustrative, but not limiting examples of monocyclopentadienyl metal components (first components) which may be used in the preparation of cationic complexes are derivatives of titanium, zirconium, vanadium, hafnium, chromium, lanthanum, etc. Preferred components are titanium or zirconium compounds. Examples of suitable monocyclopentadienyl metal compounds are hydrocarbyl-substituted monocyclopentadienyl metal compounds such as (tert-butylamido)(tetramethyl-$\eta^5$-cyclopentadienyl)-1,2-ethanediylzirconium dimethyl, (tert-butylamido)(tetramethyl-$\eta^5$-cyclopentadienyl)-1,2-ethanediyltitanium dimethyl, (methylamido)(tetramethyl-$\eta^5$-cyclopentadienyl)-1,2-ethanediylzirconium dibenzyl, (methylamido)(tetramethyl-$\eta^5$-cyclopentadienyl)-1,2ethanediyltitanium dimethyl, (ethylamido)(tetramethyl-$\eta^5$-cyclopentadienyl)methylenetitanium dimethyl, (tertbutylamido)dibenzyl(tetramethyl-$\eta^5$cyclopentadienyl) silanezirconium dibenzyl, (benzylamido)dimethyl-(tetramethyl-$\eta^5$cyclopentadienyl)silanetitanium diphenyl, (phenylphosphido)-dimethyl(tetramethyl-$\eta^5$cyclopentadienyl)silanezirconium dibenzyl, and the like.

Such components are readily prepared by combining the corresponding metal chloride with a dilithium salt of the substituted cyclopentadienyl group such as a cyclopentadienyl-alkanediyl, cyclopentadienyl-silane amide, or cyclopentadienyl-phosphide compound. The reaction is conducted in an inert liquid such as tetrahydrofuran, $C_{5-10}$ alkanes, toluene, etc. utilizing conventional synthetic procedures. Additionally, the first components may be prepared by reaction of a group II derivative of the cyclopentadienyl compound in a solvent and separating the salt by-product. Magnesium derivatives of the cyclopentadienyl compounds are preferred. The reaction may be conducted in an inert solvent such as cyclohexane, pentane, tetrahydrofuran, diethyl ether, benzene, toluene, or mixtures of the like. The resulting metal cyclopentadienyl halide complexes may be alkylated using a variety of techniques. Generally, the metal cyclopentadienyl alkyl or aryl complexes may be prepared by alkylation of the metal cyclopentadienyl halide complexes with alkyl or aryl derivatives of group I or group II metals. Preferred alkylating agents are alkyl lithium and Grignard derivatives using conventional synthetic techniques. The reaction may be conducted in an inert solvent such as cyclohexane, pentane, tetrahydrofuran, diethyl ether, benzene, toluene, or mixtures of the like. A preferred solvent is a mixture of toluene and tetrahydrofuran.

Compounds useful as a second component in the preparation of the ionic catalysts useful in this invention will comprise a cation, which is a Bronsted acid capable of donating a proton, and a compatible noncoordinating anion. Preferred anions are those containing a single coordination complex comprising a charge-bearing metal or metalloid core which anion is relatively large (bulky), capable of stabilizing the active catalyst species (the Group 3–10 or Lanthanide Series cation) which is formed when the two components are combined and sufficiently labile to be displaced by ethylenicic, diethylenicic and acetylenically unsaturated substrates or other neutral Lewis bases such as ethers, nitriles and the like. Suitable metals, then, include, but are not limited to, aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

Highly preferably, the second component useful in the preparation of the catalysts of this invention may be represented by the following general formula:

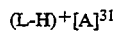

(L-H)$^+$[A]$^{31}$ wherein:
L is a neutral Lewis base;
(L-H)$^+$ is a Bronsted acid; and
[A]$^-$ is a compatible, noncoordinating anion.
More preferably [A]$^-$ corresponds to the formula:

[M'Q$_q$]$^{31}$ wherein:
M' is a metal or metalloid selected from Groups 5–15 of the Periodic Table of the Elements;
Q independently each occurrence is selected from the Group consisting of hydride, dialkylamido, halide, alkoxide, aryloxide, hydrocarbyl, and substituted-hydrocarbyl radicals of up to 20 carbons with the proviso that in not more-than one occurrence is Q halide; and
q is one more than the valence of M'.

Second components comprising boron which are particularly useful in the preparation of catalysts of this invention may be represented by the following general formula:

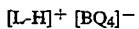

[L-H]$^+$ [BQ$_4$]$^-$ wherein:
L is a neutral Lewis base;
[L-H]$^+$ is a Bronsted acid;
B is boron in a valence state of 3; and
Q is as previously defined.

Illustrative, but not limiting, examples of boron compounds which may be used as a second component in the preparation of the improved catalysts of this invention are trialkyl-substituted ammonium salts such as triethylammonium tetraphenylborate, tripropyammonium tetraphenylborate, tris(n-butyl)ammonium tetraphenylborate, trimethylammonium tetrakis(p-tolyl)borate, tributylammonium tetrakis(pentafluorophenyl)borate, tripropylammonium tetrakis(2,4-dimethylphenyl)borate, tributylammonium tetrakis(3,5-dimethyphenyl)borate, triethylammonium tetrakis(3,5-di-trifluoromethylphenyl)borate and the like. Also suitable are N,N-dialkyl anilinium salts such as N,N-dimethyl-aniliniumtetraphenylborate, N,N-diethylanilinium tetraphenylborate, N,N-dimethyl-2,4,6trimethylanilinium tetraphenylborate and the like; dialkylammonium salts such as di-(i-propyl)ammonium tetrakis(pentafluorophenyl)borate, dicyclohexylammonium tetraphenylborate and the like; and triaryl phosphonium salts such as triphenylphosphonium tetraphenyiborate, tri(ethylphenyl)phosphonium tetrakis-pentafluorophenylborate, tri(dimethylphenyl)phosphonium tetraphenylborate and the like.

Preferred ionic catalysts formed in this manner are those having a limiting charge separated structure corresponding to Formula (IV):

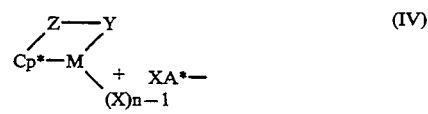

wherein:
M is a titanium, zirconium, or hafnium;
Cp*, X, and Z are as defined for Formula (I);
n is 1, 2, 3, or 4 and is 2 less than the oxidation state of M; and
XA*— is —XB(C$_6$F$_5$)$_3$.

This class to cationic complexes may be conveniently prepared by-contacting a metal compound corresponding to Formula (V):

wherein:
Cp*, M, and n are as previously defined for Formula (IV), with tris(pentafluorophenyl)borane cocatalyst under conditions to cause abstraction of X and formation of the anion —XB(C$_6$F$_5$)$_3$.

Preferably X in the foregoing ionic catalyst is C$_1$-C$_{10}$ hydrocarbyl, most preferably methyl.

Formula (V) is referred to as the limiting, charge separated structure. However, it is to be understood that, particularly in solid form, the catalyst may not be fully charge separated. That is, the X group may retain a partial covalent bond to the metal atom, M. Thus, the catalysts may be alternately depicted as possessing Formula (VI):

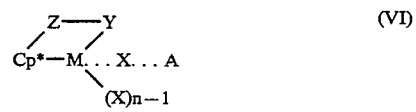

The catalysts are preferably prepared by contacting the derivative of a Group 4 or Lanthanide metal with the tris(pentafluorophenyl)borane in an inert diluent such as an organic liquid. Tris(pentafluorophenyl)borane is a commonly available Lewis acid that-may be readily prepared according to known techniques. The compound is disclosed in Marks, et al. *J. Am. Chem. Soc.* 1991, 113, 3623-3625 for use in alkyl abstraction of zirconocenes.

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

Other compounds which are useful in the catalyst compositions of this invention, especially compounds containing other Group 4 or Lanthanide metals, will, of course, be apparent to those skilled in the art.

The polymerization conditions for manufacturing the polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes are also useful in the present invention, such as those disclosed in U.S. Pat. No. 3,914,342, incorporated herein by reference. The multiple reactors can be operated in series or in parallel, with at least one constrained geometry catalyst employed in at least one of the reactors.

In general, the continuous polymerization according to the present invention may be accomplished at conditions well known in the prior art for Ziegler-Natta or Kaminsky-Sinn type polymerization reactions, that is, temperatures from 0° to 250° C. and pressures from atmospheric to 1000 atmospheres (100 MPa). Suspension, solution, slurry, gas phase or other process conditions may be employed if desired. A support may be employed but preferably the catalysts are used in a homogeneous (i.e., soluble manner. It will, of course, be appreciated that the active catalyst system, form in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

The present foam structure may take any physical configuration known in the art, such as sheet, plank, or bun stock. Other useful forms are expandable or foamable particles, moldable foam particles, or beads, and articles formed by expansion and/or coalescing and welding of those particles.

Excellent teachings to processes for making ethylenic polymer foam structures and processing them are seen in C. P. Park, "Polyolefin Foam", Chapter 9, *Handbook of Polymer Foams and Technology*, edited by D. Klempner and K. C. Frisch, Hanser Publishers, Munich, Vienna, New York, Barcelona (1991), which is incorporated herein by reference.

The present foam structure may be prepared by blending and heating an ethylenic polymer material and a decomposable chemical blowing agent to form a foamable plasticized or melt polymer material, extruding the foamable melt polymer material through a die, inducing cross-linking in the melt polymer material, and exposing the melt polymer material to an elevated temperature to release the blowing agent to form the foam structure. The polymer material and the chemical blowing agent may be mixed and melt blended by any means known in the art such as with an extruder, mixer, blender, or the like. The chemical blowing agent is preferably dry-blended with the polymer material prior to heating the polymer material to a melt form, but may also be added when the polymer material is in melt phase. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature (typically, 150° C.–250° C.) such as in an oven to form a foam structure. radiation cross-linking is used, the foamable structure is irradiated to cross-link the polymer material, which is then expanded at the elevated temperature as described above. The present structure can advantageously be made in sheet or thin plank form according to the above process using either cross-linking agents or radiation.

The present foam structure may also be made into a continuous plank structure by an extrusion process utilizing a long-land die as described in GB 2,145,961A, which is incorporated herein by reference. In that process, the polymer, decomposable blowing agent and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material.

The present foam structure may also be formed into cross-linked foam beads suitable for molding into articles. To make the foam beads, discrete resin particles such as granulated resin pellets are: suspended in a liquid medium in which they are substantially insoluble such as water; impregnated with a cross-linking agent and a blowing agent at an elevated pressure and temperature in an autoclave or other pressure vessel; and rapidly discharged into the atmosphere or a region of reduced pressure to expand to form the foam beads. A version is that the polymer beads is impregnated with blowing agent, cooled down, discharged from the vessel, and then expanded by heating or with steam. In a derivative of the above process, styrene monomer may be impregnated into the suspended pellets along with the cross-linking agent to form a graft interpolymer with the ethylenic polymer material. Blowing agent may be impregnated into the resin pellets while in suspension or, alternately, in non-hydrous state. The expandable beads are then expanded by heating with steam and molded by the conventional molding method for the expandable polystyrene foam beads.

The foam beads may then be molded by any means known in the art, such as charging the foam beads to the mold, compressing the mold to compress the beads, and heating the beads such as with steam to effect coalescing and welding of the beads to form the article. Optionally, the beads may be pre-heated with air or other blowing agent prior to charging to the mold. Excellent teachings of the above processes and molding methods are seen in C. P. Park, *Supra*, pp. 227–233, U.S. Pat. No. 3,886,100, U.S. Pat. No. 3,959,189, U.S. Pat. No. 4,168,353, and U.S. Pat. No. 4,429,059, which are incorporated herein by reference. The foam beads can also be prepared by preparing a mixture of polymer, cross-linking agent, and decomposable mixtures in a suitable mixing device or extruder and form the mixture into pellets, and heat the pellets to cross-link and expand.

There is another process for making cross-linked foam beads suitable for molding into articles. The ethylene polymer material is melted and mixed with a physical blowing agent in a conventional foam extrusion apparatus to form an essentially continuous foam strand. The foam strand is granulated or pelletized to form foam beads. The foam beads are then cross-linked by radiation. The cross-linked foam beads may then be coalesced and molded to form various articles as described above for the other foam bead process. Additional teachings to this process are seen in U.S. Pat. No. 3,616,365 and C. P. Park, *Supra*, pp. 224–228, which are incorporated herein by reference.

The present foam structure may be made in bun stock form by two different processes. One process involves the use of a cross-linking agent and the other uses radiation.

The present foam structure may be made in bun stock form by mixing the ethylenic polymer material, a cross-linking agent, and a chemical blowing agent to form a slab, heat the mixture in a mold so the cross-linking agent can cross-link the polymer material and the blowing agent can decompose, and expand by release of pressure in the mold. Optionally, the bun stock formed upon release of pressure may be re-heated to effect further expansion.

Cross-linked polymer sheet is made by higher irradiating polymer sheet with high energy beam or by heating a polymer sheet containing chemical cross-linking agent. The cross-linked polymer sheet is cut into the desired shapes and impregnated with N2 in a higher pressure at a temperature above the softening point of the polymer; releasing the pressure affects nucleation of bubbles and some expansion in the sheet. Reheat the sheet in a low pressure vessel under pressure above the softening point and release the pressure so that the foam can expand.

Blowing agents useful in making the present foam structure include decomposable chemical blowing agents. Such chemical blowing agents decompose at elevated temperatures to form gases or vapors to blow the polymer into foam form. The agent preferably takes a solid form so it may be easily dry-blended with the polymer material. Chemical blowing agents include azodicarbonamide, azodiisobutyro-nitrile, benzenesulfonhydrazide, 4,4-oxybenzene sulfonyl-semi-carbazide, p-toluene sulfonyl semi-carbazide, barium azodicarboxylate, N,N'-dimethyl-N,N'-dinitrosoterephthaiamide, N,N'-dinitrosopentamethylenetetramine, 4-4-oxy-bis (benzenesulfonylhydrazide), and trihydrazino triazine. Azodicarbonamide is preferred. Additional teachings to chemical blowing agents are seen in C. P. Park, *Supra*, pp. 205–208, and F. A. Shutov, "Polyolefin Foam", *Handbook of Polymer Foams and Technology*, pp. 382–402, D. Klemper and K. C. Frisch, Hanser Publishers, Munich, Vienna, New York, Barcelona (1991), which is incorporated herein by reference.

The chemical blowing agent is blended with the polymer material in an amount sufficient to evolve about 0.2 to about 5.0, preferably from about 0.5 to about 3.0, and most preferably from about 1.0 to 2.5 moles of gas or vapor per kilogram of polymer.

Cross-linking agents useful in making the present foam structure are the organic peroxides. Useful organic peroxides cross-linking agents include 1,1-di-t-butyl peroxy-3,3,5-trimethylcyclohexane, dicumyl peroxide, 2,5-dimethyl-2,5-di(t-butyl peroxy) hexane, t-butyl-cumyl peroxide, $\alpha,\alpha'$-di(butyl peroxy)-diisopropyl benzene, di-t-butyl peroxide, and 2,5-dimethyl- 2,5-di-(t-butyl peroxy) hexyne. Dicumyl peroxide is the preferred agent. Additional teachings to organic peroxide cross-linking agents are seen in C. P. Park, *Supra*, pp. 198–204, which is incorporated herein by reference.

Cross-linking by radiation may be effected by any of the conventional types. Useful radiation types include an electron beam or beta ray, gama rays, x-rays, or nuetron rays. Radiation is believed to effect cross-linking by generating polymer radicals, which may combine and cross-link. Additional teachings concerning radiation cross-linking are seen in C. P. Park, *Supra*, pp. 198–204, which is incorporated herein by reference.

In some processes for making the present structure, a physical blowing agent may be used. Physical blowing agents include organic and inorganic agents. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane.

The amount of blowing agent incorporated into the polymer melt material to make a foam-forming polymer gel is from about 0.2 to about 5.0, preferably from about 0.5 to about 3.0, and most preferably from about 1.0 to 2.50 moles per kilogram of polymer.

The present foam structure has a cross-linked density of from 5 to 90 percent and more preferably from 30 to 70 percent according to ASTM D-2765-84, method A.

The present foam structure has density of less than 500, more preferably less than 250 and most preferably from about 10 to about 150 kilograms per cubic meter. The foam has an average cell size of from about 0.05 to about 5.0, more preferably from about 0.1 to about 2.0, and most preferably 0.2 to about 1.0 millimeters according to ASTM D3576.

The present foam structure may be closed cell or open cell. Preferably, the present foam is greater than 90 percent closed-cell according to ASTM D2856-A.

Various additives may be incorporated in the present foam structure such as inorganic fillers, stability control agents, nucleating agents, pigments, antioxidants, acid scavengers, ultraviolet absorbers flame retardants, processing aids, extrusion aids, and the like.

The following are examples of the present invention, and are not to be construed as limiting. Unless otherwise indicated, all percentages, parts, or proportions are by weight.

EXAMPLES

Example 1

Cross-linked ethylenic polymer foam structures of the present invention are made according to the process set forth below. A substantially linear ethylenic polymer prepared with a constrained geometry catalyst (CGCT resin) is cross-linked with dicumyl peroxide (DCP), and expanded with azodicarbonamide to form the foam structures.

The CGCT resin, DCP, and azodicarbonamide were processed in a Model System 90 Torque Rheometer mixing bowl (Haake Buchler Instrumentis, Inc.). The CGCT resin was an ethylene/octene copolymer 76/24 (measured by infrared technique of ASTM 2238, method B) having a density of 0.873 g/cc, melt index ($I_2$) of 5.2 dg/min, and $I_{10}/I_2$ of 10.4. Forty grams of the granular resin is mixed, under nitrogen blanket, with 6 grams of azodicarbonamide in the Haake mixer maintained at 140° C. and 20 rpm motor speed for 5 minutes. Subsequently, predetermined amounts of DCP were added and mixed for an additional 5 minutes. The foamable mixture was pressed into sheet of approximately 0.080 inch (2 millimeters (mm)) in thickness on a hot press at 150° C. The sheet was cut to approximately ½ inch×½ inch (1.3 centimeters×1.3 centimeters) size specimens. The foamable specimens were then expanded in a hot air oven maintained at 230° C. for various lengths of time to determine the optimum expansion time.

As shown in Table 1, the resin provided reasonably low density foams having small cell size at a relatively wide range of DCP level and oven exposure time. Foams having densities as low as 4.8 pounds per cubic foot (pcf) (77 kg/m³) was achieved at 0.8 DCP level. The foam was very flexible, tough and resilient.

TABLE 1

| Test No. | DCP Level[1] | Expansion Time[2] | Foam Density[3] | Foam Density[4] | Cell Size[5] |
|---|---|---|---|---|---|
| 1.1 | 0.5 | 180 | 24.6 | 423 | ND |
| 1.2 | 0.5 | 220 | 23.1 | 370 | ND |
| 1.3 | 0.7 | 180 | 18.5 | 296 | ND |
| 1.4 | 0.7 | 190 | 5.7 | 90 | ND |
| 1.5 | 0.7 | 200 | 14.5 | 232 | ND |
| 1.6 | 0.8 | 190 | 5.3 | 85 | 0.35 |
| 1.7 | 0.8 | 230 | 4.8 | 77 | 0.30 |
| 1.8 | 0.9 | 150 | 7.4 | 119 | ND |
| 1.9 | 0.9 | 180 | 7.8 | 125 | ND |
| 1.10 | 1.0 | 180 | 8.00 | 128 | ND |
| 1.11 | 1.0 | 190 | 37.4 | 599 | ND |

TABLE 1-continued

[1] Parts of dicumyl peroxide mixed in per one hundred parts of polymer
[2] Time specimen allowed to expand in the oven in seconds
[3] Density of foam body in pounds per cubic foot
[4] Density of foam body in kilograms per cubic meter
[5] Cell size in millimeters determined per ASTM D3576, ND = not determined

Example 2

Cross-linked ethylenic polymer foam structures of the present invention were made substantially according to the process of Example 1 except a different CGCT resin was used. The CGCT resin had a density of 0.888 g/cc, a melt index of 3.0, and a $I_{10}/I_2$ of 7.9.

As shown in Table 2, good quality foam structures of relatively low density were obtained. The minimum density obtained was 6.1 pcf (98 kg/m³) in Test 2.9, which was somewhat higher than the minimum obtained in Example 1 (Test 1.7). The cell size of the foam structure in Test 2.9 was 0.39 mm. The foam structures of Example 1, which utilized a higher $I_{10}/I_2$ resin than those of Example 2, were more desirable than those of Example 2 because of their lower density. The higher $I_{10}/I_2$ resin provides a higher melt elasticity, which is apparently beneficial for foam expansion.

TABLE 2

| Test No. | DCP Level[1] | Expansion Time[2] | Foam Density[3] | Foam Density[4] |
|---|---|---|---|---|
| 2.1 | 0.5 | 180 | 23.4 | 375 |
| 2.2 | 0.5 | 220 | 32.6 | 522 |
| 2.3 | 0.7 | 180 | 15.2 | 243 |
| 2.4 | 0.7 | 220 | 20.7 | 331 |
| 2.5 | 0.8 | 190 | 12.9 | 207 |
| 2.6 | 0.8 | 230 | 8.4 | 135 |
| 2.7 | 0.9 | 200 | 9.5 | 152 |
| 2.8 | 0.9 | 215 | 8.6 | 138 |
| 2.9 | 0.9 | 220 | 6.1 | 98 |
| 2.10 | 1.0 | 180 | 35.2 | 564 |
| 2.11 | 1.0 | 210 | 8.8 | 140 |
| 2.12 | 1.0 | 225 | 41.7 | 668 |

[1] Parts of dicumyl peroxide mixed in per one hundred parts of polymer
[2] Time specimen allowed to expand in the oven in seconds
[3] Density of foam body in pounds per cubic foot
[4] Density of foam body in kilograms per cubic meter

Example 3

Cross-linked ethylenic polymer foam structures of the present invention were made substantially in accordance with Example 1 except a resin blend was employed. The resins employed were blends of a CGCT LLDPE resin and a conventional LDPE resin. The resin blend was a 50/50 blend by weight of the CG3 resin having a density of 0.92, a melt index of 1.1, an $I_{10}I_2$ of 7.2 and a conventional LDPE resin having 0.916 g/cc density and 5.5 melt index.

A good quality foam of 4.1 pcf (66 kg/m³) and 0.41 mm cell size was achieved at a DCP level of 0.4 pph. The results demonstrated that a low melt index CGCT resin could be used with an LDPE resin to make a low density foam.

Example 4

A cross-linked ethylenic polymer foam structure of the present invention was made substantially in accordance with Example 1 with the same CGCT resin. The DCP level and expansion time were 0.8 pph and 230 seconds, respectively.

The resulting foam structure had a reasonably low density of 4.2 pcf (67.2 kgm) and a reasonably small cell size of 0.8 mm.

The foam structure exhibited desirable strength and toughness characteristics. The structure had a compressive strength @25%(ASTM D-3575B) of 2.8 psi (pounds per square inch), a compressive set at 50% deflection (ASTM D-3575A) of 18%, a tensile strength (t.s.) (ASTM D-3575E) of 92 psi, and a tensile elongation (t.e.) (ASTM D-3575E) of 394%. Toughness may be calculated according to (t.s.)×(t.e.)/(2)(100) to yield a desirably high value of 362 psi.

While embodiments of the foam structure and the process for making it of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A process for making a cross-linked ethylene polymer foam structure, comprising:
   a) forming a foamable melt polymer material by blending and heating a decomposable chemical blowing agent and an ethylene polymer material comprising a blend of:
      1) an ethylene polymer selected from the group consisting of an ethylene/vinyl acetate copolymer, a high density polyethylene, a medium density polyethylene, and an ethylene/ester copolymer, and a copolymer of ethylene and an ethylenically unsaturated carboxylic acid; and
      2) a substantially linear ethylene polymer having:
         i) a melt flow ratio, $I_{10}/I_2$, $\geq 5.63$;
         ii) a molecular weight distribution, $M_w/M_n$, defined by the equation: $M_w/M_n \leq (I_{10}/I_2) - 4.63$; and
         iii) a critical shear rate at onset of surface melt fracture of at least 50 percent greater than the critical shear rate at the onset of surface melt fracture of a linear ethylene polymer having about the same $I_2$ and $M_w/M_n$;
   b) inducing cross-linking in the foamable melt polymer material; and
   c) expanding the foamable melt polymer material by exposing it to an elevated temperature to form the foam structure.

2. The process of claim 1, wherein the $M_w/M_n$ is from about 1.5 to about 2.5.

3. The process of claim 1, wherein the substantially linear ethylene polymer having from about 0.01 to about 3 long chain branches/1000 carbons along the polymer backbone.

4. The process of claim 3, having about 0.01 to about 1 long chain branches/1000 carbons along the polymer backbone.

5. The process of claim 3, having about 0.05 to about 1 long chain branches/1000 carbons along the polymer backbone.

6. The process of claim 1, wherein the foam composition is 80 percent or more closed-cell.

7. The process of claim 1, wherein the foam composition has a density of less than 250 kilograms per cubic meter.

8. The process of claim 1, wherein the ethylene polymer material comprises greater than 70 percent by weight of ethylene monomeric units.

9. The process of claim 1, wherein the foam composition is an extruded foam composition.

10. The process of claim 1, wherein the $I_{10}/I_2$ is about 8 or more.

11. The process of claim 1, wherein the $I_{10}/I_2$ is about 9 or more.

12. The process of claim 1, wherein the rheological processing index is less than or equal to 70 percent of that of a linear ethylene polymer which lacks long-chain branching at about the same $I_2$ and $M_w/M_n$.

13. The process of claim 1, wherein the process is a foam bead.

14. The process of claim 1, wherein cross-linking is induced by irradiating the foamable melt polymer material.

15. The process of claim 1, wherein cross-linking is induced by incorporating a cross-linking agent into the foamable melt polymer material and exposing it to an elevated temperature.

16. A process for making a cross-linked ethylene polymer foam structure, comprising:
   a) forming a foamable melt polymer material by blending and heating a decomposable chemical blowing agent and an ethylene polymer material comprising a blend of:
      1) a polymer selected from the group consisting of a polystyrene, a high impact polystyrene, a styrene-butadiene block copolymer, and a polyisoprene; and
      2) a substantially linear ethylene polymer having:
         i) a melt flow ratio, $I_{10}/I_2$, $\geq 5.63$;
         ii) a molecular weight distribution, $M_w/M_n$, defined by the equation: $M_w/M_n \leq (I_{10}/I_2) - 4.63$; and
         iii) a critical shear rate at onset of surface melt fracture of at least 50 percent greater than the critical shear rate at the onset of surface melt fracture of a linear ethylene polymer having about the same $I_2$ and $M_w/M_n$;
   b) inducing cross-linking in the foamable melt polymer material; and
   c) expanding the foamable melt polymer material by exposing it to an elevated temperature to form the foam structure.

* * * * *